United States Patent
Sun et al.

(10) Patent No.: US 9,383,498 B2
(45) Date of Patent: Jul. 5, 2016

(54) LIGHT-CONDENSING SHEET, BACKLIGHT AND LIQUID CRYSTAL DISPLAY

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Haiwei Sun, Beijing (CN); Hyungkyu Kim, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 173 days.

(21) Appl. No.: 14/235,624

(22) PCT Filed: Dec. 11, 2013

(86) PCT No.: PCT/CN2013/089135
§ 371 (c)(1),
(2) Date: Jan. 28, 2014

(87) PCT Pub. No.: WO2014/190721
PCT Pub. Date: Dec. 4, 2014

(65) Prior Publication Data
US 2015/0124198 A1    May 7, 2015

(30) Foreign Application Priority Data
May 27, 2013  (CN) .......................... 2013 1 0200370

(51) Int. Cl.
F21V 8/00    (2006.01)
G02B 5/28    (2006.01)

(52) U.S. Cl.
CPC .............. *G02B 6/0025* (2013.01); *G02B 5/289* (2013.01); *G02B 6/0031* (2013.01)

(58) Field of Classification Search
CPC ..... G02B 6/0025; G02B 6/0031; G02B 5/289
USPC .......................................................... 349/62
See application file for complete search history.

(56) References Cited

U.S. PATENT DOCUMENTS 6,753,064 B1 *  6/2004  Nakama ................ B29C 43/021
                                                        359/577
6,951,400 B2 * 10/2005  Chisholm .............. G02B 5/045
                                                        359/485.03

(Continued)

FOREIGN PATENT DOCUMENTS

CN    1967342 A      5/2007
CN    201439904    *  4/2010

(Continued)

OTHER PUBLICATIONS

International Search Report Appln. No. PCT/CN2013/039135; Dated Mar. 20, 2014.
First Chinese Office Action Appln. No. 201310200370.5; Dated Nov. 25, 2014.
Second Chinese Office Action Appln. No. 201310200370.5; Dated Jun. 11, 2015.

(Continued)

Primary Examiner — Sang V Nguyen
(74) Attorney, Agent, or Firm — Ladas & Parry LLP

(57) ABSTRACT

Embodiments of the invention disclose a light-condensing sheet, a backlight and a liquid crystal display. The light-condensing sheet comprises a supporter and a plurality of flat light-condensing films provided on the supporter, and refractive indexes of the plurality of light-condensing films gradually increase from bottom to top.

11 Claims, 3 Drawing Sheets

(56) References Cited

U.S. PATENT DOCUMENTS

| | | | |
|---|---|---|---|
| 2003/0039034 A1* | 2/2003 | Hatano | G02B 27/4272 359/576 |
| 2004/0165371 A1* | 8/2004 | Kitamura | G02B 6/0028 362/627 |
| 2006/0142448 A1* | 6/2006 | Choi | C08K 5/10 524/315 |
| 2008/0272454 A1* | 11/2008 | Toshikiyo | G02B 5/1876 257/443 |
| 2009/0167986 A1* | 7/2009 | Lee | G02B 5/0289 349/64 |
| 2013/0155517 A1* | 6/2013 | Park | G02B 5/0221 359/599 |

FOREIGN PATENT DOCUMENTS

| | | |
|---|---|---|
| CN | 201439904 U | 4/2010 |
| CN | 201464763 U | 5/2010 |
| CN | 202330747 U | 7/2013 |
| CN | 103293573 A | 9/2013 |

OTHER PUBLICATIONS

Third Chinese Office Action dated Nov. 23, 2015; Appln. No. 201310200370.5.

International Preliminary Report on Patentability issued Dec. 1, 2015; PCT/CN2013/089135.

* cited by examiner

LIGHT-CONDENSING SHEET, BACKLIGHT AND LIQUID CRYSTAL DISPLAY

TECHNICAL FIELD

Embodiments of the invention relate to a light-condensing sheet, a backlight and a liquid crystal display.

BACKGROUND

Liquid crystal display is generally formed by assembling a liquid crystal display panel and a backlight. The backlight mainly comprises a light source (such as, a lamp group), a backboard, a reflection plate, a frame, a light guide plate, a diffusion film, a lower prism film, an upper prism film, a polarizing sheet and the like. The upper prism film and the lower prism film are used for adjusting the direction of the light emitted from the diffusion film so that the light are converged and emitted along the front-view direction, and thereby the brightness is increased.

FIG. 1 is a structure of a conventional prism film. As can be seen from FIG. 1, the conventional prism film has a wavy structure. The wavy structure is easily scratched, so it is likely to generate white spots and/or bright spots thereon. Moreover, the conventional prism film is easy to generate a Moire phenomenon as shown in FIG. 2 (the Moire phenomenon refers to the phenomenon that the defect of bright and dark strips is generated due to the interference between the upper prism film and the lower prism film), and accordingly a decline in image quality of the display is resulted.

SUMMARY

According to one aspect of the invention, a light-condensing sheet is provided. The light-condensing sheet comprises a supporter and a plurality of flat light-condensing films provided on the supporter, and refractive indexes of the plurality of light-condensing films gradually increase from bottom to top.

For example, the refractive indexes of the plurality of light-condensing films are of 1.5 to 1.7.

For example, the plurality of light-condensing films are made of ultraviolet curing adhesive.

For example, light propagates along a direction in which the refractive indexes of the plurality of light-condensing films increase.

According to another aspect of the invention, a backlight is provided. The backlight comprises a light source, a backboard, a reflection plate, a frame, a light guide plate, a diffusion film and at least one light-condensing sheet. The light-condensing sheet comprises a supporter and a plurality of flat light-condensing films provided on the supporter, and refractive indexes of the plurality of light-condensing films gradually increase from bottom to top.

For example, the backlight includes two or more light-condensing sheets.

For example, the refractive indexes of the plurality of light-condensing films are of 1.5 to 1.7.

For example, the plurality of light-condensing films are made of ultraviolet curing adhesive.

For example, light propagates along a direction in which the refractive indexes of the plurality of light-condensing films increase.

According to yet another aspect of the invention, a liquid crystal display is provided. The liquid crystal display comprises a liquid crystal display panel and the backlight as mentioned above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

In the following description of the embodiments of the invention, it should be noted that "bottom" and "top" are the directional or positional relationship based on the drawings, which are merely for facilitating the description of the embodiments of the invention, rather than indicating or implying that the structure must be constructed in the specific direction.

Figure 1:
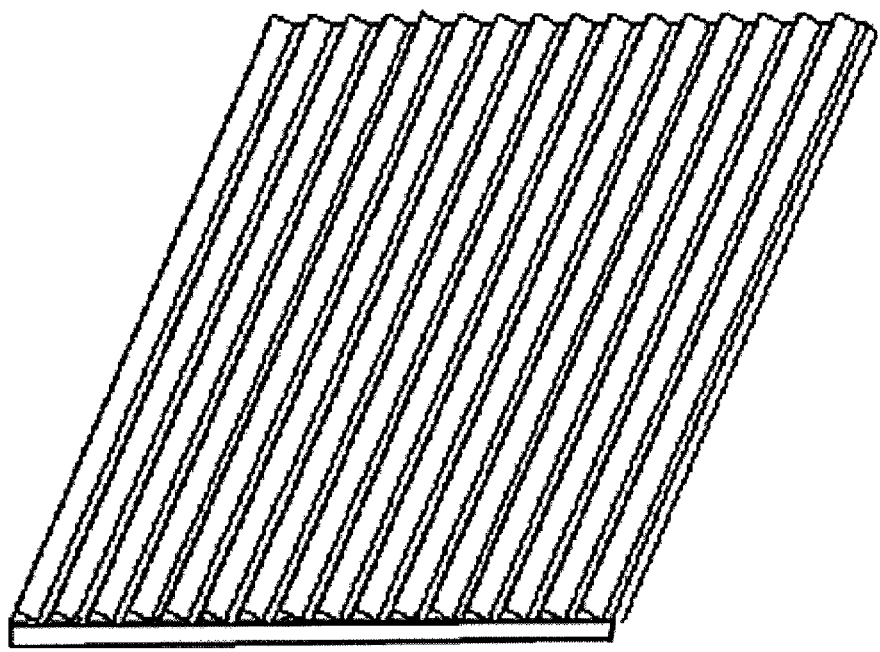
FIG. 1 is a schematic view illustrating a prism film in a conventional backlight.
Figure 2:
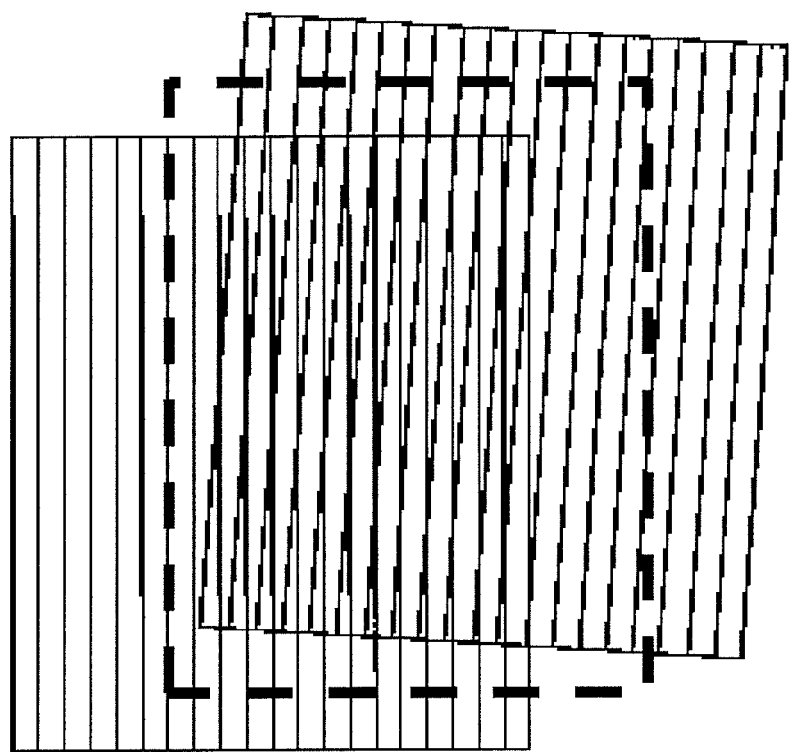
FIG. 2 is a schematic view illustrating a Moire phenomenon caused by the prism films in the conventional backlight.
Figure 3:
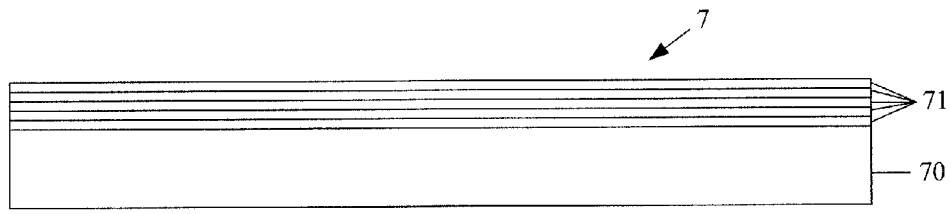
FIG. 3 is a schematic view illustrating a light-condensing sheet according to an embodiment of the invention.

FIG. 3 is a schematic view illustrating a light-condensing sheet 7 according to an embodiment of the invention. The light-condensing sheet 7 comprises a supporter 70 and a plurality of flat light-condensing films 71 provided on the supporter 70, and refractive indexes of the plurality of light-condensing films 71 gradually increase from bottom to top. For example, the supporter 70 is made of polyethylene terephthalate (PET). During the light-condensing sheet 7 is used, light propagates along a direction in which the refractive indexes of the plurality of light-condensing films 71 increase. After the light is incident into the light-condensing films 71 through the supporter 70, the light is refracted by the light-condensing films 71, so that the refraction angle of the light ultimately emitted from the light-condensing sheet 7 is reduced and the light ultimately emitted from the light-condensing sheet 7 is approximately perpendicular to a surface of the light-condensing sheet 7. Thus, the light-condensing sheet 7 achieves the function of condensing light. During the light-condensing sheet 7 according to the embodiment of the invention is installed in a backlight, compared with the wavy prism film in the conventional technology, the light-condensing sheet 7 according to the embodiment of the invention can not be scratched due to its flat surface, thus white spots, bright spots as well as Moire phenomenon generated by interference between conventional prism films can be avoided and the image quality of the display can be enhanced.

Figure 4:
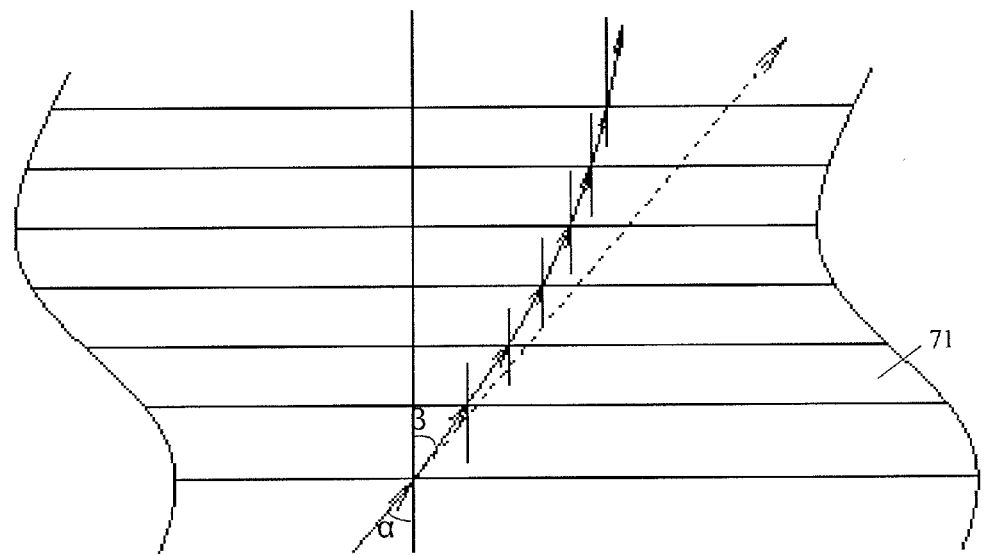
FIG. 4 is a schematic view illustrating that light is refracted by the light-condensing sheet according to the embodiment of the invention.

FIG. 4 is a schematic view illustrating the status in which the light is refracted by the light-condensing sheet 7 according to the embodiment of the invention. Referring to FIG. 4, it is assumed that the refractive indexes of two adjacent light-condensing films 71 respectively are $n_1$ and $n_2$, where $n_1 < n_2$. When the light enters into the light-condensing film 71 with the refractive index of $n_2$ from the light-condensing film 71 with the refractive index of $n_1$, an incident angle is $\alpha$, an exit angle is $\beta$ and a relative refractive index is $\sin \alpha / \sin \beta = n_2/n_1$. It can be clearly seen that: the greater $n_2$ is, the smaller the exit angle $\beta$ is, that is, the light is more approximately perpendicular to the surface of the light-condensing film 71. In this way, the light can be converged easily and emitted from the front-view direction, and thus the brightness is increased. For this purpose, the light-condensing films 71 are made of materials with high refractive index, such as the materials having the refractive index of 1.5 to 1.7.

The light-condensing films 71 in the above light-condensing sheet 7 may be made of different materials with different refractive indexes, such as acrylic, PET, ultraviolet curing adhesive and the like. In addition, the light-condensing films 71 in the above light-condensing sheet 7 may be made of same materials with different refractive indexes. In this case, for example, ultraviolet curing adhesive may be used for forming the light-condensing films 71. The ultraviolet curing adhesive mainly comprises acrylic and epoxy resin, and the refractive index of the ultraviolet curing adhesive may be changed by changing the contents of sulfur and aromatic in the epoxy resin.

In the embodiment of the invention, the light-condensing films 71 may be made of the ultraviolet curing adhesive, and the following description is made by taking the example in which the light-condensing films 71 are formed by the ultraviolet curing adhesive.

It should be noted that, different users have different requirements on brightness decay in side-view direction and brightness decay in front-view direction, so the number of the light-condensing films 71 in the light-condensing sheet and the thickness of each light-condensing film 71 are not limited in the embodiment and they can be selected depending on the users' practical requirements.

Figure 5:
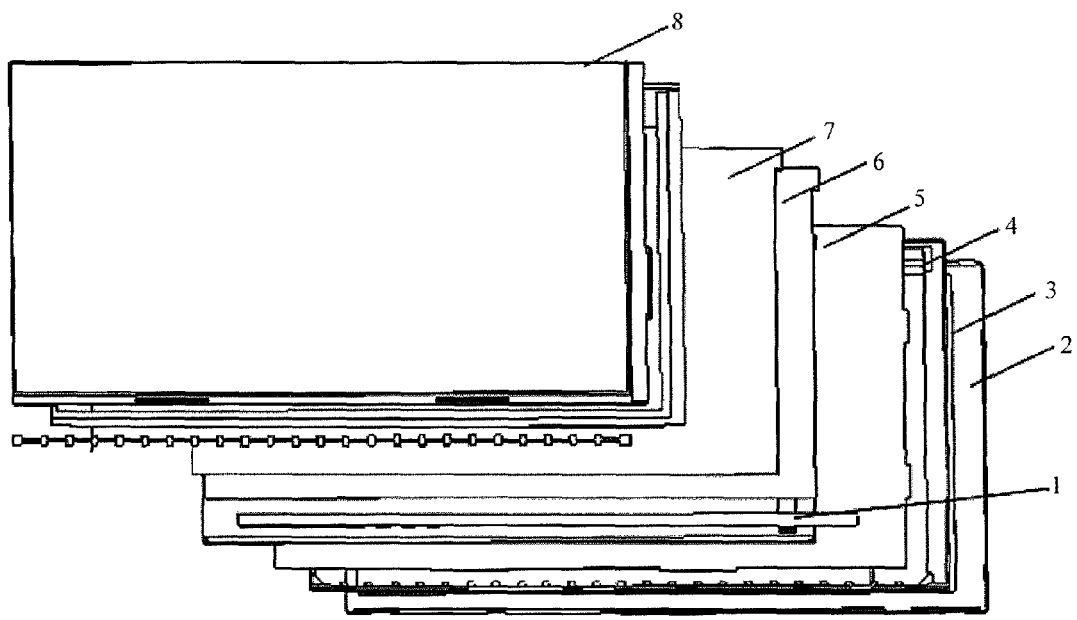
FIG. 5 is a schematic view illustrating a liquid crystal display according to an embodiment of the invention.

An embodiment of the invention further provides a backlight. Referring to FIG. 5, the backlight comprises a light source 1, a backboard 2, a reflection plate 3, a frame 4, a light guide plate 5, a diffusion film 6 and at least one light-condensing sheet 7. The light-condensing sheet 7 comprises the supporter 70 and the plurality of flat light-condensing films 71 provided on the supporter 70 as shown in FIG. 3, and the refractive indexes of the plurality of light-condensing films 71 gradually increase from bottom to top. During the light-condensing sheet 7 is used, light propagates along the direction in which the refractive indexes of the plurality of light-condensing films 71 increase.

After the light emitted from the light source 1 enters into the light-condensing sheet 7 through the light guide plate 5 and the diffusion film 6, the light is refracted by the light-condensing films 71 in the light-condensing sheet 7. Since the refractive indexes of the light-condensing films 71 gradually increase from bottom to top, the refraction angle of the light ultimately emitted from the light-condensing sheet 7 is reduced and the light ultimately emitted from the light-condensing sheet 7 is approximately perpendicular to the surface of the light-condensing sheet 7, and thus the light-condensing sheet 7 achieves the function of condensing light. The backlight adopts the light-condensing sheet 7 according to the embodiment of the invention. Compared with the wavy prism film in the conventional technology, the light-condensing sheet 7 according to the embodiment of the invention can not be scratched due to its flat surface, thus white spots, bright spots as well as Moire phenomenon generated by interference between conventional prism films can be avoided and the image quality of the display can be enhanced.

Two or more light-condensing sheets 7 may be adopted in the backlight so as to promote the light-condensing effect, and in this case, the light can be more easily converged and emitted from the front-view direction and the brightening can be further increased.

The light-condensing sheet 7 adopted in the backlight according to the embodiment of the invention has the same structure and operation principle with the light-condensing sheet described with reference to FIG. 3, so the light-condensing sheet 7 is not repeatedly described here.

FIG. 5 is a schematic view illustrating a liquid crystal display according to an embodiment of the invention. The liquid crystal display comprises a liquid crystal display panel 8 and a backlight. The backlight comprises a light source 1, a backboard 2, a reflection plate 3, a frame 4, a light guide plate 5, a diffusion film 6 and at least one light-condensing sheet 7. The light-condensing sheet 7 comprises the supporter 70 and the plurality of flat light-condensing films 71 provided on the supporter 70 as shown in FIG. 3, and the refractive indexes of the plurality of light-condensing films 71 gradually increase from bottom to top. During the light-condensing sheet 7 is used, light propagates along the direction in which the refractive indexes of the plurality of light-condensing films 71 increase.

The light-condensing sheet 7 adopted in the liquid crystal display has the same structure and operation principle with the light-condensing sheet described with reference to FIG. 3, so the light-condensing sheet 7 is not repeatedly described here.

A fabrication method of the light-condensing sheet according to an embodiment of the invention is briefly described below. Referring to FIG. 3 again, the fabrication method of the light-condensing sheet may comprise:

S10. Providing a supporter 70;

S11. Sputtering a layer of ultraviolet curing adhesive on the supporter 70;

S12. Planarizing the ultraviolet curing adhesive sputtered on the supporter 70 by a coating process;

S13. Curing the ultraviolet curing adhesive by a curing process to form a flat light-condensing film 71 on the supporter 70;

S14. Repeating steps S11-S13 to form a plurality of flat light-condensing films 71 on the supporter 70. The times for repeating the steps S11-S13 are determined according to the users' practical requirements.

The embodiments described above are merely exemplary embodiments of the invention, and the scope of the invention is not limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. A light-condensing sheet, comprising a supporter and a plurality of flat light-condensing films provided on the supporter, wherein
    the plurality of light-condensing films are made of ultraviolet curing adhesive, and
    the ultraviolet curing adhesive mainly comprises acrylic and epoxy resin; and
    contents of sulfur and aromatic in the epoxy resin of the plurality of light-condensing films are different from each other, so that refractive indexes of the plurality of light-condensing films gradually increase from bottom to top.

2. The light-condensing sheet according to claim 1, wherein the refractive indexes of the plurality of light-condensing films are of 1.5 to 1.7.

3. The light-condensing sheet according to claim 1, wherein light propagates along a direction in which the refractive indexes of the plurality of light-condensing films increase.

4. The light-condensing sheet according to claim 3, wherein the refractive indexes of the plurality of light-condensing films are of 1.5 to 1.7.

5. A backlight, comprising a light source, a backboard, a reflection plate, a frame, a light guide plate, a diffusion film and at least one light-condensing sheet, wherein
the light-condensing sheet comprises a supporter and a plurality of flat light-condensing films provided on the supporter;
the plurality of light-condensing films are made of ultraviolet curing adhesive, and
the ultraviolet curing adhesive mainly comprises acrylic and epoxy resin; and
contents of sulfur and aromatic in the epoxy resin of the plurality of light-condensing films are different from each other, so that refractive indexes of the plurality of light-condensing films gradually increase from bottom to top.

6. The backlight according to claim 5, wherein the backlight includes two or more light-condensing sheets.

7. The backlight according to claim 5, wherein the refractive indexes of the plurality of light-condensing films are of 1.5 to 1.7.

8. The backlight according to claim 5, wherein light propagates along a direction in which the refractive indexes of the plurality of light-condensing films increase.

9. The backlight according to claim 8, wherein the backlight includes two or more light-condensing sheets.

10. The backlight according to claim 8, wherein the refractive indexes of the plurality of light-condensing films are of 1.5 to 1.7.

11. A liquid crystal display, comprising a liquid crystal display panel and the backlight according to claim 5.

* * * * *